INVENTOR
THOMAS M. RIDDICK
BY
Curtis, Morris & Clifford
ATTORNEYS

United States Patent Office 3,454,487
Patented July 8, 1969

3,454,487
ELECTROPHORESIS CELL FOR MEASURING THE ELECTROKINETIC POTENTIAL OF DISPERSED PARTICLES
Thomas M. Riddick, 200 East End Ave., New York, N.Y. 10028
Continuation-in-part of application Ser. No. 73,090 Dec. 1, 1960. This application June 8, 1964, Ser. No. 377,169
Int. Cl. B01k *5/00;* B01d *59/42*
U.S. Cl. 204—299                               23 Claims

ABSTRACT OF THE DISCLOSURE

An electrophoresis cell having sample receiving chambers connected by a liquid-flow communication passageway. The cell is advantageously provided with passageways which extend the flow communication passageway completely through the cell to enable the cell to be cleaned with ease. The cell disclosed can be emptied, cleaned, and quickly prepared for reuse. It is thus suitable for advantageous use in situations requiring continuous or routine readings of electrokinetic potential.

---

This invention relates to electrophoresis cell apparatus and, more particularly, to such apparatus for measuring the zeta potential of particles dispersed in a fluid as indicated by the electrophoretic mobility of such particles as influenced or determined by the quantity and polarity of the electrostatic charges on the surfaces thereof. This application is a continuation-in-part of co-pending application S.N. 73,090, filed Dec. 1, 1960, now abandoned.

The term "zeta potential" (or "electrokinetic potential") is now well understood in colloidal chemistry as an indication of the electrophoretic mobility of particulate matter colloidally suspended or dispersed in a fluid suspending medium, and as an indication of the velocity or migration of a colloid particle (or droplet) through a fluid suspending medium under the effect of an applied electric field. As will be understood, the concept derives from the proposition advanced by Helmholtz that, with regard to colloidal particles suspended in a fluid medium, the suspended particles are considered electrically neutral (in the sense that they appear to possess little if any activity with regard to an electroscope) but have an electrically charged double layer of electrons at the surface of the particles. That is, with suspended particulate material in a fluid medium, each particle is surrounded by a double layer of electrical or electrostatic charges, the inner layer of which may be considered immediately adjacent and fixed to the particle, while the outer layer of charges may relate more to constitutents or characteristics of the suspending medium and to possess a charge opposite to that of the inner layer.

The net electric charge surrounding the particle, therefore, may be substantially zero with a resulting electric neutrality of the particle, yet, as is now well understood, such double layer of electric charges (or, as it is frequently called "diffuse double layer") produces a colloidal and/or interfacial effect on the mobility or occluding tendency of the particles and/or the electrokinetic potential or electrophoretic mobility thereof in the suspending medium. As originally suggested by Helmholtz (although more recently refined by such workers in the colloidal chemistry field as Smoluchowski, Abramson, Gouy, Nernst, Verewey, Overbeek, etc.) the zeta potential may be conveniently considered as the electrical potential drop across the diffuse double layer of electric charges at the interface between the surface of the particle and the bulk of the suspending medium.

The measurement of the zeta potential, then, gives an indication and useful information with regard to the electrophoretic or electrokinetic movement or migration or mobility of colloidal or other and larger dispersed particles through a suspending medium, and regardless of whether the suspension may be considered lyophobic or lyophilic. Particularly in instances where the electrophoretic mobility of such particles is of significance—e.g., with the agglomeration or setting of the suspended particles and/or the entrapment or occulsion thereof into a flocculent precipitant as in the treatment of water supplies or sewage or industrial wastes or agglomeration of particles for industrial precipitation or other dispersant or particle-removal situations—a convenient and rapid or continuous method of measuring the zeta potential (or the electrophoretic mobility) of particles suspended in a fluid or liquid medium may be desired.

If one attempts to utilize a number of the various electrophoresis cells and/or measurement techniques for the zeta potentia (such as the conventional Burton or Hittorf-Duclaux or Pugh-Schwarts or Briggs or Kunits-Northrup or Mattson, etc., cells or techniques), difficulty may be experienced in that the optical or other characteristics of the cell are quite exacting or that the particular apparatus is quite easily broken or that the apparatus is difficult to clean after each testing or that standardization of the apparatus is required after each reading or series of readings, etc. Thus, if one is thinking in terms of a continuous or routine reading of zeta potentials in, for example, the day-to-day operation of a municipal water purification system or an industrial process wherein the zeta potential is an important control for either maintaining suspension or inducing the precipitation of colloidal materials in a fluid medium, utilization of standard or conventional or well known apparatus or methods for the measurements of zeta material and/or the indication thereby or therefrom of electrophoretic or electrokinetic mobility of suspended particles may prove to be uneconomical.

According to this invention, by contrast, there is provided apparatus and methods for the direct measurement of zeta potential or electrophoretic mobility on a continuous or routine and economical basis utilizing an electrophoresis cell which can, conveniently, be fabricated of substantially unbreakable materials and can be utilized, in accordance herewith, for continuous measurement; and, as a further feature of this invention, such cell is readily cleaned in but a few moments, does not require standardization, is available for the direct utilization of the medium being tested without oil immersion techniques, can be further utilized without change or adjustment for also measuring electrical conductivity, and is simple and inexpensive to manufacture and operate.

It is, accordingly, one object of this invention to provide for the measurement in an electrophoresis cell of the zeta potential and/or electrophoretic mobility of particulate matter suspended in a fluid medium, and in which repeated or continuous readings are obtainable without intermediate re-standardization of the cell.

A further object of this invention is to provide an electrophoresis cell of the character described for utilization in the microscopic determination of zeta potential and in association with directly immersed electrodes for inducing electrophoretic migration of particles suspended or dispersed in a liquid medium, and with the cell being constructed of substantially unbreakable materials and being readily cleanable for re-use in a short period of time.

Another object of this invention is to provide methods and apparatus for the ready measurement of zeta potential and/or electrophoretic mobility of charged colloidal particles suspended in a liquid medium, and to measure this zeta potential in such medium as the particles suspended therein migrate directly to or under the influence of an electric field directly induced into the medium through electrodes immersed therein, and without a separate medium for either the electrodes or for repeated standardizations of the cell or for the particles as to which the zeta potential is being measured.

Still a further object of this invention is to provide apparatus of the character described for the direct measurement of both zeta potential and electrical conductivity on the same sample of liquid without cleaning or emptying or restandardizing the apparatus.

Still another object of this invention is to provide, for methods and apparatus of the character described, additional modifications of cells embodying and for practicing this invention and especially adapted for specialized microelectrophoresis studies for extending the total range of measurement, and for accommodating specialized fluids or materials or situations.

Other objects and advantages of this invention will be apparent from the following description, the accompanying drawings, and the appended claims.

Figure 1:
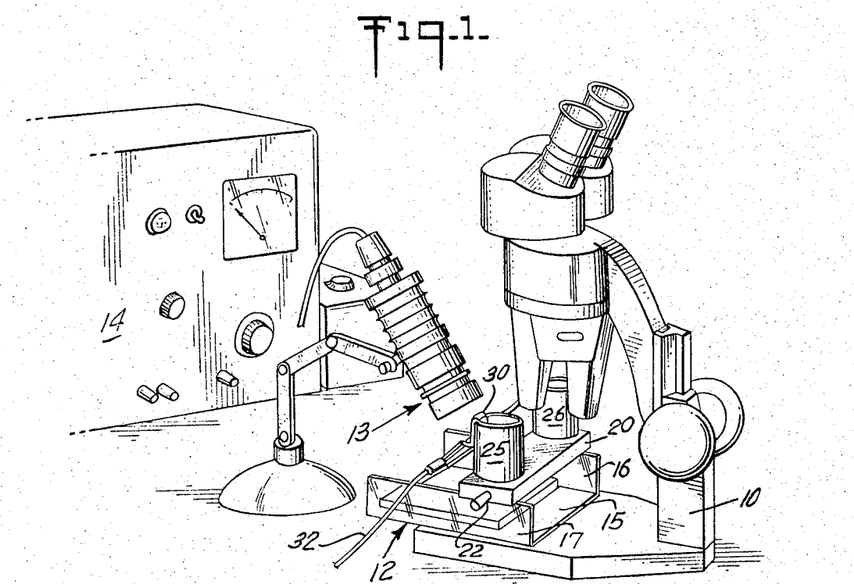
FIG. 1 illustrates, in perspective, an arrangement and assemblage of apparatus for the measurement of the zeta potential or electrophoretic mobility of colloidal particles dispersed in a water medium in accordance with and embodying this invention.
Figure 2:
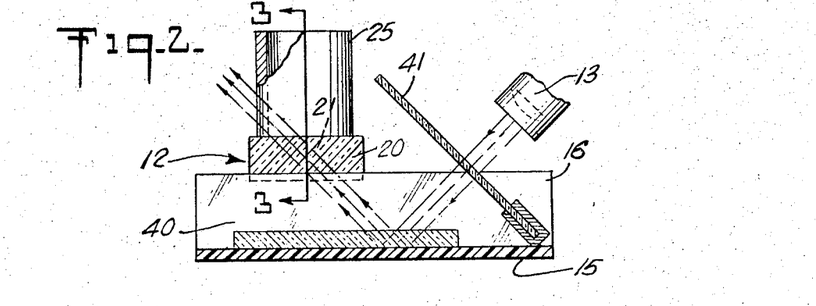
FIG. 2 is a vertical transverse sertion, partly broken away and taken on the line 2—2 of FIG. 3, of the electrophoresis cell of the assemblage of FIG. 1 and embodying and for practicing this invention.
Figure 3:
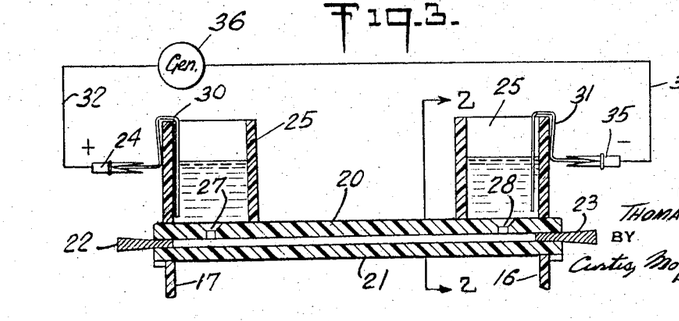
FIG. 3 is a partial vertical section of the electrophoresis cell apparatus illustrated in FIG. 2 and taken along the line 3—3 thereof.

Referring to the drawings, in which like characters of reference refer to like parts throughout the several views thereof, an assemblage of apparatus embodying and for practicing this invention is indicated as including a conventional stereoscopic microscope indicated at 10, on the base of which rests the cell assembly indicated generally at 12 and in more detail in FIGS. 2 and 3, with the conventional microscope illuminator or lamp being indicated at 13 for the illumination of cell 12. A DC power supply or generator is indicated at 14 for providing an electric field to be applied, as described below, for inducing migration of particles in a sample being measured for movement through cell 12 to be observed therein through microscope 10.

As indicated more particularly in FIGS. 2 and 3, cell 12 includes a base portion 15 having upstanding side walls 16 and 17, across the top edges of which is supported an elongated block 20 at least the center portion of which in the field of microscope 10 is optically transparent for observation therethrough. Longidinally through the center of block 20 is a tubular passage or boring 21, which runs completely through block 20 from one end to the other, with the open ends of passage 21 being releasably closed by resilient tapered plugs 22 and 23.

Two sample-receiving cups or chambers 25 and 26 are positioned, one at either end, on block 20, and communicate through block 20 with passage 21 therein as by open ports 27 and 28 to provide a flow path for liquid and particles therein back and forth between cups 25 and 26 through passage 21 in block 20. Also positioned in cups 25 and 26 are electrodes 30 and 31 for direct contact with liquid in the respective cups 25 and 26. Conducting wires 32 and 33 are attached, as by clips 24 and 35, to electrodes 30 and 31 for the impressing thereon of a DC electrical potential as from power supply 14, or, as indicated more diagrammatically in FIG. 3, any suitable source 36 of DC potential. Also, as indicated in FIGS. 1 and 2, a plane optical mirror 40 is positioned on base 15 of the cell for reflecting illumination from lamp 13 upwardly through block 20 and passage 21 therein. Preferably, although optionally, a heat-absorbing filter 41 is interposed in the illuminating beam from lamp 13, as indicated in FIG. 2, to avoid localized heating of the illuminated area of block 20 and passage 21 therein by heat from the intensely concentrated beam of light from lamp 13.

As indicated in the drawings, the foregoing assemblage of apparatus is ready for use with the cell 12 positioned beneath the objective of microscope 10 so that the vertical axis of the optical field of microscope 10 coincides with a vertical diameter of the cross-section of passage 21 and with lamp 13 positioned to direct an illuminating beam across passage 21 and, as reflected from mirror 40, at an angle of 45° with the vertical axis of the objective of microscope 10, as indicated in FIG. 2.

There are, as will be understood, a variety of materials from which cell 12, and particularly block 20 thereof, can be fabricated, provided that at least that portion of block 20 falling within the optical field of the objective of microscope 10 is clearly and optically transparent. For reasons of economies of manufacture (and particularly in the drilling or boring of passage 21), as well as for economies in use to eliminate breakage and expedite cleaning, it is preferred that the entire cell 12 (or, at least, that part thereof illustrated in FIG. 3) be made of transparent and reasonably inert plastic material such as, for example, methyl methacrylate plastic sold under the trademark Lucite.

Also, the component parts of cell 12 may be produced with a variety of dimensions, although satisfactory results have been achieved in accordance with this invention by forming cups 25 and 26 of a size to have a combined capacity of about 25 cc. of liquid, with the effective length of passage 21 being 10.0 cm. and having a diameter of 3.175 mm. (0.125″). Satisfactory results have also been achieved in accordance with such apparatus where electrodes 30 and 31 were formed of iridium-hardened platinum strips about ½″ wide by 2″ long, although, of course, the entire length of the electrode is not immersed in the liquid being sampled.

In operation, and particularly with the cell constructed and assembled as illustrated, fairly rapid measurements of zeta potential can be obtained, and then the cell can be emptied and cleaned quickly to receive another sample. For example, removing plugs 22 and 23 from the ends of passage 21 permits the rapid cleaning of this passage with, for example, a common wire pipe cleaner or a stream of water. As will be apparent, the measurements of various samples of liquid do not depend on the precise spacing between electrodes 30 and 31, so repeated standardizations of a cell embodying this invention are not required before each measurement of a new sample and despite moving or removing electrodes 30 and 31 during each cleaning of the cell, and the optical characteristics of plastic material such as the aforementioned Lucite and the design of a cell embodying this invention also eliminate the need for highly optically polished thin and readily breakable glass sections for the cell in the optical field of microscope 10 or oil immersion or other exacting microscopic optical techniques.

As will be understood from the foregoing, electrophoretic mobility or zeta potential is determined in accordance herewith by impressing a DC voltage of 50 to 500 volts (preferably by 100 to 500 v.) from power supply 14 across the cell between electrodes 30 and 31, and microscopically observing the travel or migration of particulate matter in the liquid being examined from anode to cathode, or vice versa. This rate of travel or migration is satisfactorily measured by timing (as with a conventional stop watch) the traverse or migration of an observed particle across a measured distance scale, as provided in microscope 10 by a conventional and well understood ocular micrometer. Satisfactory results have been achieved using the well known Whipple ocular micrometer with a stereoscopic microscope as shown, and with the divisions or scaled increments thereof indicating distances of 350 microns with a 2× objective, 175 microns with a 4× objective, 117 microns with a 6× objective, and 87 microns with a 8× objective.

From this basic determination of average microns per second of migration of particles observed in the liquid being examined as induced by the impressed electrical field of known potential, the electrophoretic mobility or zeta potential is readily calculated, with the single timing measurement giving directly either electrophoretic velocity or, by calculation therefrom, the zeta potential in millivolts, as well understood, and/or, in cases where merely comparatice determinations are desired as between different samples, the timing readings alone may be sufficient without converting into either velocity or potential units. Although a wide variety of DC voltage generators may be used, satisfactory results have been achieved with a vacuum tube generator of conventional design with, preferably, a switch for reversing polarity as desired.

As illustrative, the well understood formula for determining zeta potential indicates that this value (in millivolts, in practical units, not electrostatic units) is obtained by multiplying 4 times the electrophoretic mobility in terms of microns/second/volt/cm. times the viscosity of the suspending medium, divided by the dielectric constant thereof. Thus, since for any given suspending medium the viscosity and dielectric constant, as well as the numerical constant, are all non-variable or constant factors in such an equation, the zeta potential is directly proportional to the electrophoretic mobility of the particles being observed and directly measured through the microscope as under the influence of the voltage applied to the cell. Although both viscosity and dielectric constant of the suspending medium will vary with the temperature thereof, such variations are automatically compensated for to the temperature of measurement at the time of making the computation from the observed mobility of the particles to zeta potential.

Actually, with a cell embodying this invention, it is not even necessary also to measure the amperage as a corrective factor in view of the fact that the passage 21 is of a uniform diameter throughout its length and of a substantially greater diameter than the passages through which the medium to be measured flowed in previous type of electrophoresis cells. Also, as noted above, because of the construction in accordance herewith, the electrodes 30 and 31 may be relatively quite large with respect to the cell, yet since the interconnecting ports 27 and 28 connect the electrode-contacting medium directly with passage 21 and are spaced 10 centimeters apart, there is enabled a ready conversion of voltage output from generator 36 to volts per cm.

Even with normal raw water or tap water, voltages of less than 50 volts can be accurately employed, but it is generally impractical (from the human, rather than the electrical, standpoint) to observe and time particles that take more than one or two minutes to go from one division line to another on the ocular micrometer. From the practical standpoint, it has been found that observations of about one minute (and selecting an impressed voltage which will produce such speed of movement of the particles) gives a general accuracy of determination from which zeta potential can be calculated within an accuracy of plus or minus one millivolt. A greater number of readings or measurements on the same medium (i.e., examining a greater number of different particles under the same conditions as they move sequentially across the optical field of the microscope) can produce an average reading which is believed to be accurate within plus or minus 0.1 millivolt.

The exact optical characteristics to be employed in a system in accordance herewith may, of course, be somewhat variable depending upon the type of size of particle the mobility of which it is intended to observe and measure. The indirect lighting arrangement illustrated in FIG. 2 (whereby a thin intense beam of light is reflected through passage 21 at an angle of 45° with the vertical optical axis of the microscope) enables particles of extremely small size to be counted, either directly or as tiny points of light reflected into the optical system by either the flat or rounded surface of the particles. For example, with the illustrated arrangement and using only 60 powers of magnification (15 power eye-piece and 4 power objective), satisfactory observations have been made for the measurment of the electrophoretic mobility of bacilli bacteria only 2 or 3 microns in length and no more than 1 micron in diameter—i.e., of a size much smaller than could actually be seen under 60 powers of magnification even with fixing the bacteria culture and staining the bacteria.

A further optical advantage is obtained in accordance herewith in utlizing a transparent cell with a passage 21 of circular cross-section and having the preferred diameter of 0.125"—especially as compared with the ease of using either flat cells or circular passage of substantially different diameter. Thus, as is well understood, it is desired to measure or observe the mobility of particles at the point in the stream of fluid at which electro-osmosis is substantially zero. In a passage of circular cross-section, such point of zero electro-osmosis is either about 15% or 85% of the diameter of the passage measured from the wall thereof at any point. Whereas it may be a tedious task to focus the microscope (regardless of the shape of the cell) at the desired level (as by measuring with two focusings and then correcting with a vertical micrometer on the microscopes), a single focusing suffices with the arrangement here.

That is, in viewing the transparent cell through the microscope with a liquid medium therein, the edge of passage 21 is seen twice as two parallel lines—one of which is the true outer surface of passage 21 as seen through the transparent material of the cell and the other is the "apparent" wall of the cell as refracted inwardly by the index of refraction of the liquid in the cell and/or because it is being viewed through the optical interface between liquid and cell material. With the circular cross-section of passage 21, if the microscope is focused so that the actual (outer) wall of passage 21 stands out sharply as a straight line, it is focused at the mid-depth of passage 21. With the microscope so focused and with a diameter of passage 21 of about 0.125" (plus or minus about 0.003"), an accurate determination of a point 15% of the diameter away from the pasage wall at the horizontal mid-plane thereof is readily determined by placement of the optical micrometer so that the top transverse line thereof is provisioned to coincide with the visible line indicating the actual wall of tube 21, whereupon the "counting lane" of the micrometer (i.e., the next division thereof) will be at the desired 15% point.

It has also been noted that a diameter of 3/16″ for passage 21 may not give so readily a sharp focusing line for determining the mid-depth, although this point, as well as the desired measurement point of zero electro-osmosis, can be determined according to conventional microscopy techniques; but such determnation may substantially extend the time required for performing one reading or measurement. It may also be noted that a diameter of passage 21 substantially less than 1/8″ (e.g., 1/16″) is not preferred in that it may be too small to provide the desired clearance for free flow of liquid and suspended particles, nor does it provide the above noted preferred ready focusing technique. A substantially larger diameter for passage 21 (e.g., 1/4″) would reduce the area of focus to a greater extent than a 1/8″ passage, but it is more difficult to determine accurately the optical mid-depth.

In addition to utilizing the methods and apparatus in accordance herewith for the measurement of the electrophoretic mobility of zeta potential, the specific conductance of the liquid in the cell may also be determined merely by placing a microammeter in series with the connections of the electrodes 30 and 31 to the power supply 14. In a cell in which the effective length of passage 21 is 10 cm. between ports 27 and 28 and the diameter is 0.125″ (3.175 mm.), the specific conductance (in micro-ohms) is calculated as being 122 times the current conducted between the electrodes (in micro-amperes) divided by the voltage potential across the electrodes 30 and 31 (in practical volts). Since the dimensions of the disclosed cell 12 which might affect conductivity measurements remain substantially constant despite re-use and cleaning of the cell, only a single standardization need be made (in known manner and utilizing a standardizing solution of an electrolyte) merely for compensating for or realizing any slight variations in the diameter of passage 21 which might be caused in the drilling or reaming thereof in manufacture, or in the length or spacing thereof, and/or from any voltage loss between the electrodes and the ports 27 and 28 of passage 21.

In addition to utilizing the methods and apparatus in accordance herewith for the measurement of the electrophoretic mobility or zeta potential, the specific conductance of the liquid in the cell may also be determined merely by placing a microammeter in series with the connections of electrodes 30 and 31 to the power supply 14. In a cell in which the effective length of passage 21 is 10 cm. between ports 27 and 28 and the diameter is 3.175 mm., the specific conductance (in micromhos) is computed as being 122 times the current conducted between the electrodes (in microamps) divided by the voltage potential across the electrodes 30 and 31. Since the dimensions of the cell 12 which might affect conductivity measurements remain substantially constant despite re-use and cleaning of the cell, only a single standardization need be made (in known manner and utilizing a standardizing solution of an electrolyte) merely for compensating for or realizing any slight variations in the diameter of passage 21 (caused in the drilling and reaming thereof in manufacture) or length or spacing.

As noted, a DC current is preferred to an AC potential, in the interests of simplicity of measurement, at least with regard to suspending media the conducivity of which is not sufficiently high to result in poisoning of the cell due to electro-chemical removal of platium ions from the electrodes or other ions in solution coating out on the cell during the minute or so required for a measurement. The range of impressed voltages suggested above have been found to be satisfactory in the measurement of a variety of natural and treated waters, but the conductivity of even very highly conductive fluids are readily measured by keeping the impressed voltage suffciently low so that no gases, such as hydrogen and oxygen, are produced; and, although this may mean voltages in the range of millivolts rather than volts, modern instrumentation provides very accurate control of millivolts. In any case, the voltage should be kept sufficiently low to prevent a passage of current which would create a warming action in the liquid being measured so as to avoid superimposing connection factors or other effects on the mobility of the suspended particles being observed.

There are, however, a variety of specialized situations other than those noted in the preceding paragraph where flexibility or use and/or extended ranges of measurement are more readily accomplished by utilizing certain modifications of the cell structure referred to above as illustrated in FIG. 3, some of which modifications are illustrated in FIGS. 4–8. For example, a precise and predictable relationship among specific conductance of the liquid being observed, applied voltage, and the beginning of thermal overturn (before which a measurement should be completed to avoid thermally induced effects on the flow of particles being observde) has been found, so that, for various ranges of specific conductance it is possible to select an optimum voltage range for accurate measurement and, of course, an appropriate scale on the optical micrometer through which observation is made. In his way, the electrically induced particle migration may occur accurately at a rate moderate enough to enable visual tracking and counting of the moving particles while yet at a rate fast enough so that a significant number of particles may be observed and counted as moving past the optical micrometer within a short enough time period before there is an opportunity for thermal overturn to interject significant inaccuracies in the resulting measurement. Similarly, as will be understood, the type of electrodes and the material from which they are made and the temperature of the sample being observed or measured are further factors, the adjustment and selection of which permit further flexibiltty and ease of accurate use and range of apparatus embodying and for practicing this invention.

For example, the above noted platinum material for electrodes 30 and 31 gives generally satisfactory results with most aqueous samples having specific conductance values below about 2000 micromhos per centimeter, above which range a copper anode is preferred to replace the platinum anode, although, particularly in samples with high viscosities and/or low electrophoretic mobilities, this value may be considerably lower.

Similarly, enhanced accuracy and ease of use are achieved in accordance herewith if at least the anode-containing sample-receiving chamber 25 is closed or stoppered. As will be understood, of course, and especially with metallic electrodes, if the entire system were completely closed, gas formation at the electrodes would have to be eliminated virtually entirely since, with aqueous samples, two volumes of hydrogen would be evolved at the cathode for one volume of oxygen at the anode, and such volumetric gaseous imbalance would produce an element of liquid flow in the flow passage and a consequent false migration rate of colloid particles therein. Nevertheless, there is considerable advantage and ease of handling to be gained by having at least one of the sample chambers closed or stoppered.

Figure 4:
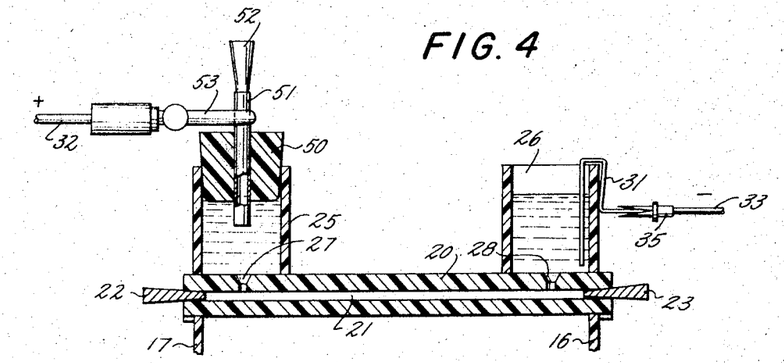
FIG. 4 is a view similar to FIG. 3 of an electrophoresis cell embodying and for practicing this invention and including a modified electrode arrangement for providing the desired impressed electric potential.

As illustrative of such an embodiment, the arrangement indicated in FIG. 4 may be noted as containing a stopper 50 (of rubber or foam latex or plastic), with the volume of liquid in chamber 25 filling it completely beneath the stopper 50 to avoid vibration-induced mechanical change in liquid level, among other advantages. In this arrangement, the anode is a hollow tube 51, instead of the strip anode 30 of FIG. 3, with a closure plug 52 to be inserted into hollow anode 51 after stopper 50 is in place and to permit complete filling of chamber 25 with liquid. An electrical connecter 53 is indicated, instead of clip 24 of FIG. 3, for connecting positive lead 32 to anode 51, while the cathode is a strip arrangement 31 as previously described and connected by clip 35 to negative lead 33. Although the operation of the arrangement of FIG. 4 is substantially the same as that previously described with regard to FIG. 3, the closed chamber 25 permits obtaining accurate readings more quickly and aids in a more stabilized condition of the liquid sample so that fewer outside forces can produce any significant variation in the flow of particles being observed. As noted above, with samples having rather high specific conductance values, the anode is preferably made of copper instead of platinum, and the tubular anode 51 of FIG. 4 is particularly adapted for such applications.

Figure 5:
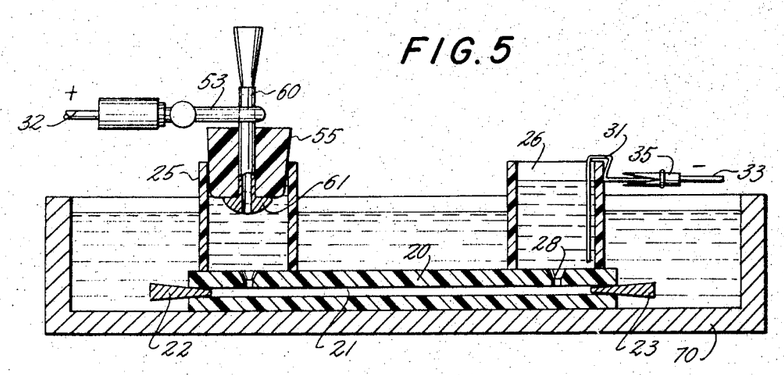
FIG. 5 is a view similar to FIG. 4, but illustrating yet a different electrode arrangement and showing the cell immersed in a coolant bath or refrigeration chamber.

As will be understood, the advantages of using a closed anode chamber might be somewhat offset if significant volumes of oxygen were formed at the anode and/or sufficiently to induce a volume change in the anode chamber 25, as might occur with some samples having relatively high specific conductances. For such applications it is preferred to use an anode arrangement as indicated in FIG. 5 in which a relatively porous foam latex stopper 55 is provided for closing anode chamber 25, and in which the anode 60 is made of readily oxidizable copper and has a relatively large volume submerged in the sampe in chamber 25 but primariy adjcaent the liquid surface therein—as by the mushroom end 61. In this arrangement, the relatively porous or cellular foam latex plug 55 is previously soaked in the sample prior to insertion in chamber 25, and the formation or accumulation of oxygen gas at the anode is virtually eliminated.

Finely divided hydrous copper oxides, which can be observed streaming copiously from the anode 60 and, particularly, the mushroom end 61 thereof, are accumulated on or in the latex stopper 55 and/or prevented by gravity or otherwise from reaching the flow passage 21. Because they are non-gaseous or otherwise, substantially no significant volumetric change in the closed anode chamber 25 is appreciable due to the formation of such oxides. As will be understood, hydrogen evolved in the open cathode chamber 26 around platinum cathode 31 therein passes off to the atmosphere and, thus, induces no liquid movement or volumetric change in chamber 26 or flow passage 21. As also will be understood, the evolution of gases, even with highly conductive samples, is of only moderate volume at most, and an experienced operator, utilizing a a very rapid measuring technique and minimum power input, is often able to obtain quite accurate readings with apparatus in accordance herewith even without the precaution of the pre-soaked foam latex plug 55. Also, if desired, a copper/sulphate coupling may be used, in accordance with general electrolytic techniques, by utilizing two copper electrodes and two latex plugs, although such technique under these circumstances is extremely exacting, with the porosity of the latex becoming a highly critical factor, and is not preferred in view of the simplicity of the foregoing arrangements.

Referring again to FIG. 5, there is also illustrated an arrangement in which the entire cell and both sample-receiving chambers are immersed in a coolant bath in a plastic of other refrigeration container 70. With this arrangement, the entire measurement can be conducted at 0° C. merely by filling container 70 with water around the outside of the electrophoresis cell and freezing the water in any standard refrigerator. With apparatus and techniques in accordance herewith, the zeta potential range determination of many colloids in aqueous suspension at room temperature may be extended up to 50,000 micromhos per centimeter, although with samples having low electrophoretic mobilities, this value may be less. The accurate operative range can be extended considerably (e.g., up to several hundred thousand micromhos per centimeter) with such refrigeration techniques and measurements in temperature ranges at least initially around 0° C. For example, the specific conductance of saturated sodium chloride approximates 250,000 micromhos per centimeter (or 4 ohms per centimeter) and yet can readily be accommodated with apparatus in accordance herewith.

It has also been noted that, when electrophoretic mobility is measured in aqueous media, with the sample and the cell at room temperature, the temperature rise of liquid in the cell passage 21 is gradual, increasing to approximately 2° C. at the onset of thermal overturn. When the cell and sample are initially at 0° C. (and even though the cell is maintained submerged in a water bath maintained at 0° C. during measurement), this temperature rise may approximate as much as 12° C. Since the apparatus here serves also as a conductivity cell, the temperature rise of the liquid medium actually passing through flow passage 21 is readily determined at the time of making each electrophoretic mobility measurement merely by noting the change in specific conductance of the sample. Thus, with the average temperature readily known, accurate computing of electrophoretic mobility and zeta potential is enhanced and regardless of whether other characteristics of the sample indicate that a measurement at room temperature or some lower refrigerated temperature is to be preferred for greatest ease of handling, accuracy, or otherwise.

Figure 6:
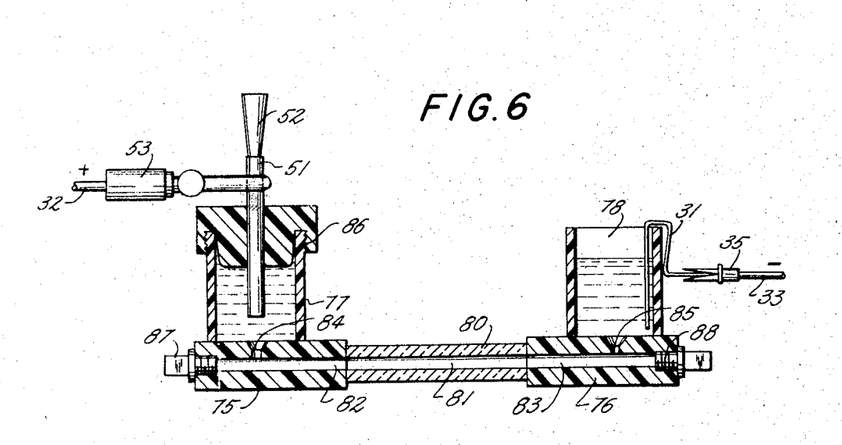
FIG. 6 is a view similar to FIG. 4, but illustrating a modification of a cell embodying and for practicing this invention and particularly adapted for the measurement of highly corrosive aqueous solutions and/or organic liquids of high solvent action and low conductivity.
Figure 8:
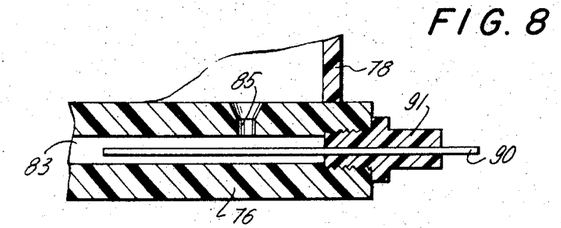
FIG. 8 is a fragmentary view of the lower right-hand corner of the apparatus in FIG. 6 illustrating the provision of electrodes in the flow passage for certain specialized applications with samples of unusually high electrical resistance characteristics.

Referring now to FIGS. 6 and 8, there is illustrated a cell device in accordance herewith particularly adapted for the handling of highly corrosive aqueous liquids and/or organic liquids of high solvent action and low conductivity. In this arrangement, the cell is formed from several parts including end portions 75 and 76, carrying respectively sample chambers 77 and 78, all of which are made of a corrosion-resistant and solvent-resistant material such as, for example, a tetrafluoroethylene plastic sold under the trademark of Teflon, while the central portion 80 is made of glass. Also in this embodiment, a flow passage 81 (like flow passage 21 previously described) is provided through the glass central section 80 and in direct flow communication with passages 82 and 83 in end portions 75 and 76, and with the latter communicating through ports 84 and 85 with, respectively, anode sample chamber 77 and cathode sample chamber 78. Whereas the usual platinum cathode 31 is shown in cathode chamber 78 with the latter open, a tubular anode 51 is shown in anode chamber 77 as being carried by a plastic cap closing chamber 77 and, preferably, forming a tight closure thereover (instead of a stopper previously described) as with a threaded connection thereto indicated at 86. Similarly, because of the corrosive nature of the sample being treated, it may be preferred to have the ends of tubes 82 and 83 threaded for the positive engagement therein of threaded plugs 87 and 88 as indicated.

With such an arrangement, highly corrosive aqueous samples and/or organic liquids of high solvent capacity (such as would attack the methyl methacrylate materials of the previous examples) can readily be handled in such an arrangement even with resistances as high as $10^{12}$ ohms/cm. With an additional arrangement as indicated in FIG. 8, the foregoing range of the cell can be extended to accommodate organic or other liquids having resistivities as high as $10^{16}$ or even $10^{22}$ ohms/cm. As noted in this view, auxiliary rod-type platinum electrodes 90 are provided for insertion into passages 82 and 83 (only the latter being shown in the fragmentary view) with the electrodes carried by plastic plugs 91 for threaded connection into the ends of passages 82 and 83 on the threads there for engaging plugs 87 and 88 in FIG. 6. The use of such electrodes actually into the ends of flow passage 82–81–83 permits raising the electric potential up to about 250 volts per centimeter, for the accommodation and adequate impressing of potential on even such highly resistant liquids.

As will be understood from the foregoing, the principal reasons for determining zeta potential in the first place generally are motivated by the desire to add some appropriate reagent to the material being tested for either enhancing dispersion of the colloid or promoting agglomeration and precipitation thereof. Accordingly, one of the measurements of principal interest in many applications of apparatus in accordance herewith may be the determination of the effect of a particular additive on the zeta potential of the sample and/or the particular resistance to zeta potential change characteristics of the type of colloid being studied. Thus, one may generalize with many lyophobic colloids at a zeta potential range of from +5 to −5 mv. indicates excellent precipitation possibilities, −10 to −20 mv. threshold precipitation, −30 to −40 mv. moderately stable and −50 to −90 and above very stable, although such generalizations do not necessarily apply specifically to various colloidal materials.

Accordingly, the total answer to a specific problem may not necessarily be dependent solely on the potential measurement alone, as distinct from the specific activities of certain reagents (such as polyelectrolytes, detergents, or various other surfactants of anionic or cationic type as may be desired to achieve a particular effect required).

Nevertheless, additional apparatus embodying and for practicing this invention readily lends itself to a micro-electrophoresis technique permitting a rapid determination, or, at least approximation, of the effect of any particular reagent on the zeta potential of a liquid sample and without removing the sample from the cell or the cell from the microscope. Additionally, such technique also enables determining the zeta potential of coarse suspensoids which might otherwise settle too rapidly for accurate tracking and observation, as well as permitting the ready determination of progressive changes in zeta potential on a particular sample brought about by measured incremental additions of reagents to the sample.

Figure 7:
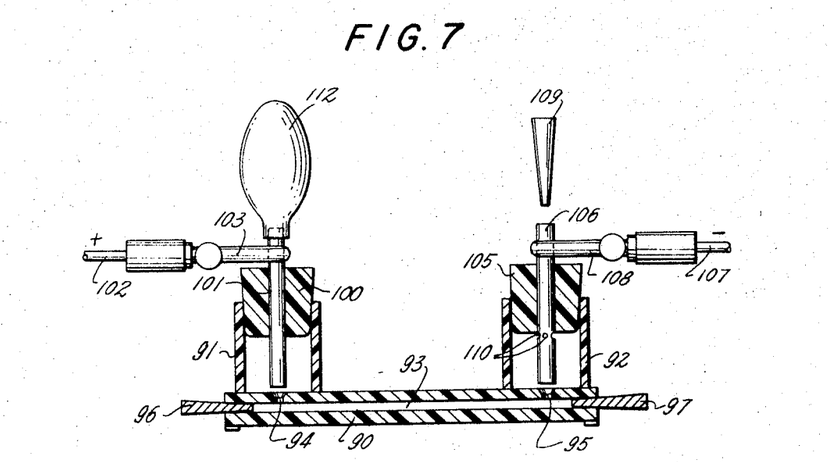
FIG. 7 is a view similar to FIG. 4 and illustrating apparatus embodying and for practicing this invention and particularly adapted for micro-electrophoresis studies of progressive changes of zeta potential in the sample being treated.

As illustrative of such an arrangement, FIG. 7 may be noted. Thus, there is provided a transparent plastic base 90, carrying sample chambers 91 and 92 thereon and having a flow passage 93 of circular cross-section therethrough as previously explained and with ports 94 and 95 communicating therewith. As in the other embodiments, passage 93 flows beyond ports 94 and 95 and completely through the whole length of base 90 with closure plugs 96 and 97 at the ends thereof. Anode sample chamber 91 is provided with a stopper 100 carrying therethrough a tube-type anode 101 (preferably of platinum) to which is connected positive lead 102 through connecter 103. Cathode sample chamber 92 also is provided with a stopper 105 having therethrough a tubular platinum electrode 106 connected to negative lead 107 by electrical connecter 108. A plug 109 is provided for closing the top end of tubular electrode 106, and one or more ports or holes 110 are provided in the lower portion of the electrode immediately beneath stopper 105. A collapsible rubber bulb 112 is affixed to the upper end of tubular anode 101, and having a capacity almost as great as that of either of the sample chambers 91 and 92.

In operation of the device, the chambers 91 and 92 are filled with sample and stopper 100 inserted with bulb 112 thereon. Then the stopper 105 and cathode 106 are inserted into cathode chamber 92. A zeta potential measurement is then taken.

Thereafter, squeezing bulb 112 and releasing will draw sample from chamber 92 into the bulb, leaving that chamber filled to only perhaps one-third to one-half its full capacity. Then, a small micro-pipette filled with the desired reagent to be tested is inserted through the top of cathode 106 and the reagent released into the partially empty chamber. Then, bulb 112 is squeezed to cause the liquid to be forced back to chamber 92, resulting in excellent mixing of measured sample with the known quantity of reagent. This mixing can be repeated several times by squeezing and releasing bulb 112. Stopper 109 is re-inserted in cathode 106, and a subsequent zeta potential determination is made to note the effect on the initial zeta potential of the injected sample of reagent.

Further mixing of the sample by means of the collapsible bulb 112 assures uniformity of liquid in the flow passage, and plug 109 insures stability of liquid during the measurement and inhibits lateral motion of the colloid during tracking. As will be understood from the foregoing, similar apparatus enables quick settling solids to be resuspended as required during tracking and without disturbing the liquid content of the sample or even removing the device from the microscope, and any temperature rise of the original liquid sample in the cell during the first determination may be somewhat offset through dilution with liquid in bulb 112 through which, as will be understood, the electric potential does not pass during a measurement, thus permitting a greater time interval for a determination.

Merely as illustrative of dimensions and capacities with which satisfactory results have been achieved in accordance herewith in such micro-electrophoresis determinations, one may note that the capacity of flow passage 93 between ports 94 and 95 is satisfactorily about 1.5 ml., while the capacity of cathode chamber 92 up to the level of ports 110 is about 16 ml., with the capacity of rubber bulb 112 being about 11 ml. Under these circumstances, with the bulb 112 filled with liquid, only about 5 ml. of liquid remains in chamber 92, which can be filled almost to capacity by depressing bulb 112.

I claim:

1. An apparatus of the character described for measuring the electrokinetic potential of electrophoretic particles dispersed in a liquid medium and under the influence of an impressed electric field, which measurement includes microscopic observation of said particles to determine the velocity of elctrophoretic mobility thereof in said impressed electric field, the combination which comprises an electrophoresis cell having an elongated substantially horizontal passage of substantially uniform circular cross-section for electrophoretic migration of said particles therethrough, a pair of sample-receiving chambers on said cell for receiving and holding a sample of said liquid and particles to be measured, means providing direct liquid flow communication between each of said chambers and said substantially horizontal passage for substantially unrestricted flow of liquid between said chambers through said passage, means for impressing said electric field on said liquid medium and adapted to be in electrical conducting contact with a liquid sample to be measured in said chambers, said passage extending throughout said electrophoresis cell and beyond said chambers providing open ends of said passage for the cleaning thereof, and means for releasably closing said open ends of said passage.

2. An apparatus of the character described for measuring the electrokinetic potential of electrophoretic particles dispersed in a liquid medium and under the influence of an impressed electric field, which measurement includes microscopic observation of said particles to determine the velocity of electrophoretic mobility thereof in said impressed electric field, the combination which comprises an electrophoresis cell having an elongated substantially horizontal passage of substantially uniform circular cross-section for electrophoretic migration of said particles therethrough, a pair of sample-receiving chambers on said cell for receiving and holding a sample of said liquid and particles to be measured, said chambers being positioned adjacent opposite ends of said elongated passage, means providing direct liquid flow communication between each of said chambers and said passage for substantially unrestricted flow of liquid between said chambers through said passage, means for impressing said electric field on said liquid medium adapted to be in electrical conducting contact with a liquid sample to be measured in said chambers, said passage extending throughout said electrophoresis cell and beyond said chambers providing open ends of said passage for the cleaning thereof including releasable closure means therefor.

3. An apparatus of the character described for measuring the electrokinetic potential of electrophoretic particles dispersed in a liquid medium and under the influence of an impressed electric field, which measurement includes microscopic observation of said particles to determine the velocity of electrophoretic mobility, thereof in said impressed electric field, the combination which comprises an electrophoretic cell having an elongated substantially horizontal passage of substantially uniform circular cross-section for electrophoretic migration of said particles therethrough, a pair of sample-receiving chambers on said cell for receiving and holding a sample of said liquid and particles to be measured, means providing direct liquid flow communication between each of said chambers and said passage for substantially unrestricted flow of liquid medium between said chambers through said passage, and a pair of electrodes adapted to be oppositely polarized in said chambers for impressing said electric field on said liquid medium and adapted to be in electrical conducting contact with a liquid sample to be measured in said chambers.

4. An apparatus of the character described for measuring the electrokinetic potential of electrophoretic particles dispersed in a liquid medium and under the influence of an impressed electric field, which measurement includes microscopic observation of said particles to determine the velocity of electrophoretic mobility thereof in said impressed electric field, the combination which comprises an electrophoretic cell having an elongated horizontal passage of substantially uniform circular cross-section for electrophoretic migration of said particles therethrough, a pair of sample-receiving chambers on said cell for receiving and holding a sample of said liquid and particles to be measured, said chambers being positioned adjacent opposite ends of said elongated passage, means providing direct liquid flow communication between each of said chambers and said passage for substantially unrestricted flow of liquid between said chambers through said passage, a pair of electrodes adapted to be oppositely polarized in said chambers for impressing said electric field on said liquid medium and adapted to be in electrical conducting contact with a liquid sample to be measured in each of said chambers, said passage being substantially straight and extending throughout said electrophoresis cell and beyond said chambers providing open ends of said passage for the cleaning thereof, and means for releasably closing said open ends of said passage.

5. In apparatus for determining the electrokinetic potential of finely divided particles electrophoretically dispersed in a liquid medium by the microscopic measurement of migration velocity of said particles under the influence of an impressed electric field, the combination which comprises an optically transparent container for said particles in said liquid medium and including a horizontal passage for the substantially unrestricted migration of said particles to be measured, microscope means adapted to receive said container in optically observable relation for microscopic observation and measurement of said migration of said particles through said passage in said container, a pair of spaced sample-receiving chambers in liquid flow communication with said passage for receiving a sample of liquid medium to be measured and for supplying it into said passage, a source of DC electrical energy, means for impressing on said apparatus said electric field from said source of DC energy for inducing electrophoretic migration of said particles through said passage and through said microscopically observable field, said passage also including extensions thereof opening to the outside of said container and horizontally beyond said chambers for the cleaning of said passage, and releasable stopper means for closing said passage and said extensions thereof at said openings thereof outside said container.

6. In apparatus for determining the electrokinetic potential of particles electrophoretically dispersed in a liquid medium by the microscopic measurement of migration velocity of said particles under the influence of an impressed electric field, the combination which comprises an optically transparent container for said particles in said liquid medium and including a horizontal passage for the substantially unrestricted migration of said particles to be measured, microscope means adapted to receive said container in optically observable relation for microscopic observation and measurement of said migration of said particles through said passage in said container, a pair of spaced sample-receiving chambers positioned adjacent opposite ends of said passage in said container and in liquid flow communication therewith for receiving a sample of liquid medium to be measured and for supplying it into said passage, a source of DC electrical energy, means for impressing on said apparatus said electric field from said electric source for inducing electrophoretic migration of said particles through said passage and through said microscopically observable field, said passage also including extensions thereof opening to the outside of said container and horizontally beyond said chambers for the cleaning of said passage, releasable stopper means for closing said passage and said extensions thereof outside said container, and means for illuminating said particles migrating through said horizontal passage for said microscopic observation thereof.

7. In apparatus for determining the electrokinetic potential of particles electrophoretically dispersed in a liquid medium by the microscopic measurement of migration velocity of said particles under the influence of an impressed electric field, the combination which comprises an optically transparent container for said particles in said liquid medium and including a horizontal passage for the substantially unrestricted migration of said particles to be measured, microscope means adapted to receive said container in optically observable relation for microscopic observation and measurement of said migration of said particles through said passage in said container, a pair of spaced sample-receiving chambers in liquid flow communication with said passage for receiving a sample of liquid medium to be measured and for supplying it into said passage, an electrode in each of said chambers and adapted to be in electrical conducting relation with liquid medium therein, a source of DC electrical energy for impressing on said apparatus said electric field and electrically connected to said electrodes for establishing an electric potential in each of said chambers but of opposite polarity for inducing said migration of said particles through said passage and through said microscopically observable field, and said passage also including extensions thereof opening to the outside of said container and horizontally beyond said chambers for the cleaning of said passage.

8. In apparatus for determining the electrokinetic potential of finely divided particles electrophoretically dispersed in a liquid medium by the microscopic measurement of migration velocity of said particles under the influence of an impressed electric field, the combination which comprises a container at least part of which is optically transparent for said particles in said liquid medium and including a passage for the substantially unrestricted migration of said particles to be measured, microscope means adapted to receive said container in optically observable relation for microscopic observation and measurement of said migration of said particles through said passage in said container, a pair of sample-receiving chambers positioned adjacent opposite ends of said passage in said container and in liquid flow communication therewith for receiving a sample of liquid medium to be measured and for supplying it into said passage, an electrode in each of said chambers and adapted to be in electrical conducting relation with a sample of said liquid medium therein, a source of DC electrical energy for impressing on said apparatus said electric field and for inducing electrophoretic migration of said particles, means for electrically connecting said electrodes to said energy source for establishing an electric potential for inducing said migration of said particles through said passages and through said microscopically observable field, said passage also including extensions thereof opening to the outside of said container and horizontally beyond said chambers for the cleaning of said passage, and releasable stopper means for closing said passage and said extensions thereof at said openings thereof outside said container.

9. Apparatus as recited in claim 8 which also includes means for illuminating said particles migrating through said passage for said microscopic observation thereof, whereby light is shown transversely across said passage at an angle of approximately 45° to the optical axis of said microscope means.

10. Apparatus as recited in claim 5 in which said passage is formed as a single continuous bore of substantially uniform circular cross-section in an otherwise solid and transparent portion of said container, and has a diameter of about 1/8".

11. In apparatus of the character described for microscopically observing electrophoretic particles dispersed in a liquid medium and under the influence of an impressed electric field to determine at a point of substantially zero electro-osmosis in said liquid medium the velocity of electrophoretic mobility of said particles in said impressed electric field to obtain measurement of the electrokinetic potential thereof, the combination which comprises an electrophoretic cell having an elongated substantially horizontal passage of substantially uniform circular cross-section for electrophoretic migration of said particles therethrough, a pair of sample-receiving chambers on said cell for receiving and holding a sample of said liquid and particles to be measured, means providing direct liquid flow communication between each of said chambers and said passage for substantially unrestricted flow of liquid medium between said chambers through said passage, and a pair of electrodes adapted to be oppositely polarized in said chambers for impressing said electric field on said liquid medium and adapted to be in electrical conducting contact with a liquid sample to be measured in said chambers.

12. Apparatus as recited in claim 9 in which said means for illuminating said particles includes a planar mirror positioned substantially perpendicular to the axis of said microscope and lighting means focused on said mirror to be reflected to form said 45° angle to said microscope axis at substantially the horizontal axis of said passage in said cell.

13. An apparatus of the character described for measuring the electrokinetic potential of electrophoretic particles dispersed in a liquid medium and under the influence of an impressed electric field, which measurement includes microscopic observation of said particles to determine the velocity of electrophoretic mobility thereof in said impressed electric field, the combination which comprises an electrophoresis cell having an elongated substantially horizontal passage of substantially uniform circular cross-section for electrophoretic migration of said particles therethrough, a pair of sample-receiving chambers on said cell for receiving and holding samples of said liquid and particles to be measured, said chambers being disposed on said cell in spaced relation along said passage and having open tops, means providing direct liquid flow communication between said chambers through said passage for substantially unrestricted flow of liquid and particles between said chambers through said passage, said passage extending substantially throughout said electrophoresis cell and beyond said chambers providing open ends of said passage for the cleaning thereof, means for releasably closing said open ends of said passage, releasable closure means including a resilient stopper for closing said open top of at least one of said chambers in liquid-tight manner, and electrode means at each of said chambers for impressing said electric field on said liquid medium and adapted to be in electrical conducting contact with a liquid sample to be measured in said chamber, said electrode means for the one of said chambers having said closure means being disposed extending through said stopper and including an axial flow passage communicating between the inside of said chamber and the outside of said stopper whereby said chamber with said stopper in place may be completely filled with said liquid sample substantially without entrapped air in said chamber above the level of liquid therein.

14. An apparatus of the character described for measuring the electrokinetic potential of electrophoretic particles dispersed in a liquid medium and under the influence of an impressed electric field, which measurement includes microscopic observation of said particles to determine the velocity of electrophoretic mobility thereof in said impressed electric field, the combination which comprises an electrophoresis cell having an elongated substantially horizontal passage of substantially uniform circular cross-section for electrophoretic migration of said particles therethrough, a pair of sample-receiving chambers on said cell for receiving and holding samples of said liquid and particles to be measured, said chambers being disposed on said cell in spaced relation along said passage and having open tops, means providing direct liquid flow communication between said chambers through said passage for substantially unrestricted flow of liquid and particles between said chambers through said passage, releasable closure means including a resilient stopper for closing said open top of at least one of said chambers in liquid-tight manner, and electrode means at each of said chambers for impressing said electric field on said liquid medium and adapted to be in electrical conducting contact with a liquid sample to be measured in said chambers, said electrode means for the one of said chamber having said closure means being disposed extending through said stopper and including an axial flow passage communicating between the inside of said chamber and the outside of said stopper, whereby said chamber with said stopper in place may be completely filled with said liquid sample substantially without entrapped air in said chamber above the level of liquid therein.

15. An apparatus of the character described for measuring the electrokinetic potential of electrophoretic particles dispersed in a liquid medium and under the influence of an impressed electric field, which measurement includes microscopic observation of said particles to determine the velocity of electrophoretic mobility thereof in said impressed electric field, the combination which comprises an electrophoresis cell having an elongated substantially horizontal passage of substantially uniform circular cross-section for electrophoretic migration of said particles therethrough, a pair of sample-receiving chambers on said cell for receiving and holding samples of said liquid and particles to be measured, said chambers being disposed on said cell in spaced relation along said passage and having open tops, means providing direct liquid flow communication between said chambers through said passage for substantially unrestricted flow of liquid and particles between said chambers through said passage, releasable closure means for closing said open top of at least of one of said chambers in liquid-tight manner, electrode means at each of said chambers for impressing said electric field on said liquid medium and adapted to be in electrical conducting contact with a liquid sample to be measured in said chambers, and means including a flow passage communicating between the inside of said chamber and the outside of said closure means whereby said chamber may be completely filled with said liquid sample substantially without entrapped air in said chamber above the level of liquid therein.

16. An apparatus of the character described for measuring the electrokinetic potential of electrophoretic particles dispersed in a liquid medium and under the influence of an impressed electric field, which measurement includes microscopic observation of said particles to determine the velocity of electrophoretic mobility thereof in said impressed electric field, the combination which comprises an electrophoresis cell having an elongated substantially horizontal passage of substantially uniform circular cross-section for electrophoretic migration of said particles therethrough, a pair of sample-receiving chambers on said cell for receiving and holding samples of said liquid and particles to be measured, said chambers being disposed on said cell in spaced relation along said passage and having open tops, means providing direct liquid flow communication between said chambers through said passage for substantially unrestricted flow of liquid and particles between said chambers through said passage, releasable closure means for closing said open top of at least one of said chambers in liquid-tight manner, electrode means at each of said chambers for impressing said electric field on said liquid medium and adapted to be in electrical conducting contact with a liquid sample to be measured in said chambers, at least one of said electrode means being disposed extending through said closure means, and a flow passage communicating between the inside of said chamber and the outside of said closure means whereby said chamber may be completely filled with said liquid sample substantially without entrapped air in said chamber above the level of liquid therein.

17. Electrophoresis cell apparatus as recited in claim 16 in which said flow passage through said closure means is included in said electrode means which extends through said closure means.

18. Electrophoresis cell apparatus as recited in claim 16 in which said electrode means disposed through said closure means forms the anode of said cell.

19. Electrophoresis cell apparatus as recited in claim 16 in which the inner end of said electrode disposed through said closure means and adapted to be in contact with said liquid in said chamber is formed as an enlarged mass of metal for enhanced electrolytic action on said liquid adjacent substantially only the liquid level thereof in said chamber, said electrolytic reaction forming gas bubbles at said enlarged end of said electrode, and at least inner portions of said closure means being porous sponge-like material for receiving and entrapping said gas bubbles for inhibiting the formation of a substantial increasing gas-filled volume above said liquid level which tends to depress said liquid level in said chamber.

20. Electrophoresis cell apparatus as recited in claim 16 in which said horizontal passage communicating between said chambers extends substantially throughout said electrophoresis cell and beyond said chambers providing open ends of said passage for the cleaning thereof, and which also includes means for releasably closing said open ends of said passage and means for inserting into said passage through said open ends thereof supplementary electrode means for impressing directly on said liquid in said passage an increased electric potential.

21. An apparatus of the character described for measuring the electrokinetic potential of electrophoretic particles dispersed in a liquid medium and under the influence of an impressed electric field, which measurements include microscopic observation of said particles to determine the velocity of electrophoretic mobility thereof in said impressed electric field and with various different liquid media, the combination which comprises an electrophoress cell having an elongated substantially horizontal passage of substantially uniform circular cross-section for electrophoretic migration of said particles therethrough a pair of sample-receiving chambers on said cell for receiving and holding samples of said liquid and particles to be measured, said chambers being disposed on said cell in spaced relation along said passage and having open tops, means providing direct liquid flow communication between said chambers through said passage for substantially unrestricted flow of liquid and particles between said chambers through said passage, releasable closure means for closing said open tops of said chambers in liquid-tight manner, electrode means at each of said chambers for impressing said electric field on said liquid medium and adapted to be in electrical conducting contact with a liquid sample to be measured in said chambers, and flow passages communicating between the inside of said chambers and the outside of said closure means whereby liquid may be added to said chambers and mixed therein without removing said closure means.

22. Electrophoresis cell apparatus as recited in claim 21 in which said flow passages through said closure means are formed within said electrode means.

23. Electrophoresis cell apparatus as recited in claim 22 which also includes a hollow flexible suction bulb at the outer end of one of said passages in one of said electrode means for withdrawing liquid from said chambers and returning it thereto without complete removal from said cell, and means for releasably closing the other of said flow passage in the other said electrode means.

References Cited
UNITED STATES PATENTS

| | | | |
|---|---|---|---|
| 673,240 | 4/1901 | Campbell | 131—223 |
| 3,031,924 | 5/1962 | Lamal | 350—95 |

OTHER REFERENCES

Abramson et al.: "Some Recent Developments in Electrokinetic Methods and Their Application to Biology and Medicine," The Electrochemical Society, May 1937.

Brinton et al.: "The Electrophoresis of Viruses Bacteria and Cells and the Microscope Method of Electrophoresis," in Electrophoresis, edited by Bier 1959, pp. 439–452.

Gray: "Electrophoresis," Scientific American, vol. 185, Issue 6, December 1951, pp. 45–53.

HOWARD S. WILLIAMS, *Primary Examiner.*

E. ZAGARELLA, *Assistant Examiner.*

U.S. Cl. X.R.

88—14; 204—180